United States Patent [19]

Kieninger et al.

[11] Patent Number: 5,054,971

[45] Date of Patent: Oct. 8, 1991

[54] APPARATUS FOR REMOVING DAMAGED PORTIONS OF RUBBER COMPONENTS

[75] Inventors: Walter Kieninger, Lahr; Ernst Füner, Friesenheim; Herbert Hetzinger, Lahr, all of Fed. Rep. of Germany

[73] Assignee: Entwicklungszentrum fur Zerspanungstechnik, Fed. Rep. of Germany

[21] Appl. No.: 480,289

[22] Filed: Feb. 15, 1990

[30] Foreign Application Priority Data

Feb. 17, 1989 [DE] Fed. Rep. of Germany ... 8901906[U]

[51] Int. Cl.[5] .......... B23B 51/04

[52] U.S. Cl. .......... 408/205; 408/144; 408/204

[58] Field of Search .......... 408/204, 205, 207, 144, 408/203; 29/22, 402.06

[56] References Cited

U.S. PATENT DOCUMENTS

| | | | |
|---|---|---|---|
| 508,795 | 11/1893 | Workheiser | 408/205 |
| 589,240 | 10/1866 | Webster | 408/204 |
| 1,020,302 | 3/1912 | Metz | 408/205 |
| 1,219,677 | 3/1917 | Sparks | 408/204 |
| 2,319,528 | 5/1943 | Barbour et al. | 408/205 |
| 2,606,615 | 8/1952 | Pevey et al. | 408/205 |
| 2,754,864 | 7/1956 | Elsy | 408/204 |
| 3,382,743 | 5/1968 | Frevathan | 408/204 |
| 3,976,387 | 8/1976 | Segal | 408/204 |

FOREIGN PATENT DOCUMENTS

| | | | |
|---|---|---|---|
| 1900580 | 8/1970 | Fed. Rep. of Germany | 408/144 |
| 1611733 | 1/1971 | Fed. Rep. of Germany | 408/204 |
| 2007526 | 9/1971 | Fed. Rep. of Germany | 408/144 |
| 2483844 | 12/1981 | France | 408/205 |
| 2529504 | 1/1984 | France | 408/204 |
| 2587245 | 3/1987 | France | 408/204 |

*Primary Examiner*—Steven C. Bishop
*Attorney, Agent, or Firm*—Nilles & Nilles

[57] ABSTRACT

The present invention refers to an apparatus for removing damaged portions of rubber components, in particular of steel-braced radial-ply tyres, including a driven and rotating tool. The tool (1) consists of a sleeve whose wall thickness tapers like a knife in the tool operating direction thus forming essentially an edge (9) and the front edge (9) of the tool has formed therein notches (7). It will be expedient when the outer circumferential surface (11) of the sleeve extends essentially parallel to the axis (13) thereof, and it will be expedient when the inner circumferential surface (15) extends at an oblique angle outwards in the front area of the sleeve. The sleeve can consist of a cutting crown (3) and of a carrier sleeve (5), the cutting crown (3) being preferably made of a material of high hardness, in particular of hard metal (FIG. 1).

16 Claims, 3 Drawing Sheets

APPARATUS FOR REMOVING DAMAGED PORTIONS OF RUBBER COMPONENTS

BACKGROUND OF THE INVENTION

The present invention refers to an apparatus for removing damaged portions of rubber components, in particular of rubber components including reinforcing elements, such as steel-braced radial-ply tires.

The repair of tires of motor vehicles normally includes the steps of removing the damaged portions by means of drilling and repairing them by vulcanization with a rubber plug. The removal of the damaged portions by means of drilling is, however, difficult especially in cases in which the tire is provided with reinforcing elements, such as a built-in steel brace. In view of these completely different materials, also the requirements which have to be met by the tool are completely different. The damaged portions are normally eliminated with the aid of conical rasps. In this connection, it is particularly disadvantageous that the wires of the steel brace or other inserts are not neatly cut, but virtually torn apart. However, such tearing does not result in a smooth surface nor in a regular round shape, and this will have the effect that the quality of the subsequently vulcanized portion is strongly impaired.

SUMMARY OF THE INVENTION

Hence, the present invention is based on the task of providing an apparatus for removing damaged portions of rubber components, in particular of steel-braced radial-ply tires, with the aid of which a smooth surface and a regular round shape of the removed damaged portion is achieved.

In accordance with the present invention, an apparatus for removing damaged portions of rubber components includes a tool, which consists of a sleeve whose wall thickness tapers like a knife in the tool operating direction thus forming essentially an edge, the front edge of the tool having formed therein notches. It is thus achieved that the rubber of the tire as well as the steel brace are cut through accurately, and this will advantageously result in a smooth surface of the portion to be vulcanized, said portion having, in addition, a round shape of high quality.

Moreover, in view of the fact that the material is cut through smoothly, the amount of material reduced in size is only small so that, on the one hand, the "cutting-out operation" can be carried out particularly fast and so that it is additionally possible to remove the rubber plugs in a comparatively neat and ecologically beneficial manner; said rubber plugs can, moreover, be subjected to adequate reprocessing.

When the sleeve is constructed such that its outer circumferential surface extends essentially parallel to the axis and that the inner circumferential surface of the sleeve extends at an oblique angle outwards, a particularly regular round marginal surface of the damaged portion will be achieved, the inwardly directed bevel facilitating the reception of the rubber plug.

When the sleeve is composed of a bit or cutting crown and of a carrier sleeve, a solution which is particulary simple from the point of view of tool technology will be obtained in an advantageous manner, since it is easily possible to adapt the cutting crown to the geometry and to the material selected.

Hence, the cutting crown can preferably be made of a material of high hardness, preferably of hard metal, a comparatively small amount of the expensive material, which requires, additionally, particularly high treatment costs, being sufficient due to the structural design of the cutting crown.

In the case of a preferred embodiment, the cutting crown is secured to the carrier sleeve, the connection being effected by means of soldering in the most simple manner. Hence, the cutting crown and the carrier sleeve have matching soldering surfaces. These soldering surfaces preferably consist of oblique end faces of the cutting crown and of the carrier sleeve, the end face of the cutting crown having the shape of an envelope of a cone. This entails the advantage that the cutting crown is guided and automatically centered by the soldering surface.

On the basis of the feature that the notches at the front edge of the sleeve or rather of the cutting crown define a sawtooth profile, which can be adapted to the material to be processed with regard to its geometry as well as with regard to the type of cutting material used, a particularly good adaptability of the tool is achieved for the respective workpiece to be processed so that, e.g. depending on the respective rubber mixture and the respective insert, the tool in question has the necessary properties for carrying out high-quality processing.

In accordance with a preferred embodiment, the carrier sleeve is provided with a recess so that material which penetrated into the cutting crown and into the carrier sleeve can laterally be discharged at the rear and so that clogging of the cutting crown by respective cut-out rubber plugs is avoided.

It will be advantageous when the recess is constructed such that it begins in the vicinity of the cutting crown increases in size and ends in an end portion, it being thus possible to guide the cut-out material effectively.

In order to construct a particularly simple reception means of the carrier sleeve, this carrier sleeve can be adapted to be attached to a reception piece for a tool drive means. The carrier sleeve is provided with an L-shaped recess in the area of its end located opposite the cutting crown so that said carrier sleeve can rapidly be replaced and received, respectively. The reception piece is provided with at least one tool guiding area for receiving the carrier sleeve, and, preferably, it is provided with a pin, which is adapted to be brought into engagement with the L-shaped recess of the carrier sleeve. This results in an advantageous manner in a bayonet-type connecting area so that the carrier sleeve is reliably guided on the one hand and can most simply and rapidly be connected and disconnected from the drive means on the other.

The reception piece is provided with several, e.g. with three tool guiding areas in an advantageous manner, said guiding areas having different diameters so as to receive carrier sleeves of different diameters for producing various sizes of the areas of cut, which are adapted to the respective size of the damaged portion in the rubber component.

When the end of the reception piece which is located opposite the tool guiding area is provided with a section which is to be inserted in a machine, said reception piece can again be connected to the driving device in a simple manner, a standardized section of this type permitting an adaptation to conventional drive means, e.g. drilling machines.

BRIEF DESCRIPTION OF THE DRAWINGS

Further details, features and advantages of the invention will be evident from the following description of an embodiment in which reference is made to the drawing and in which.

DESCRIPTION OF THE PREFERRED EMBODIMENT

Figure 1:
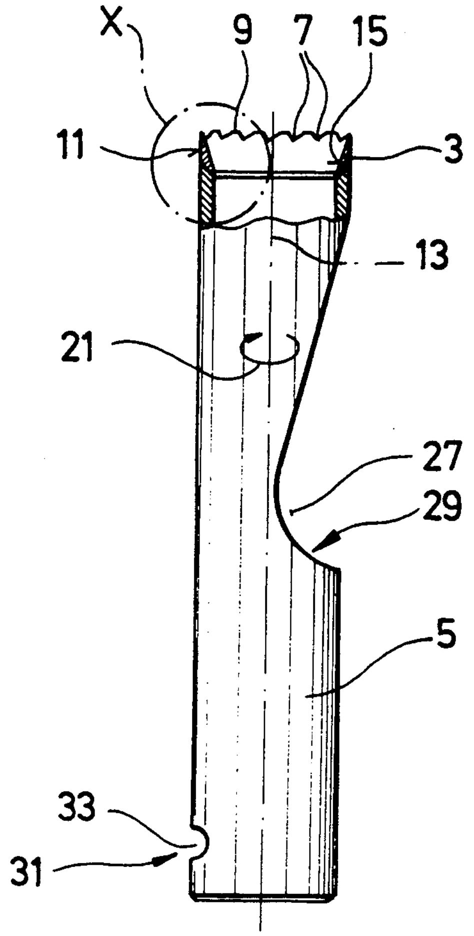
FIG. 1 shows a partially cut top view of a preferred embodiment of the tool of the apparatus according to the present invention.

According to FIG. 1, an apparatus is provided with a tool 1, which consists of a cutting crown-type sleeve 3 and of a carrier sleeve 5. The bit or cutting crown 3 is provided with notches 7 at the front end of the tool, said notches defining a sawtoothlike profile of the front edge 9 of the tool. As is clearly evident especially from FIG. 2, the front edge 9 of the tool is a tapering knifelike edge, the cross-section of the cutting crown 3 increasing continuously towards the carrier sleeve 5.

The increase in cross-section is of such a nature that the outer circumferential wall 11 of the cutting crown 3 extends essentially parallel to the axis 13 therof so that the area of cut produced extends essentially at right angles to the plane of the workpiece. The cutting crown 3 is provided with an inner circumferential wall 15, which extends from the front edge 9 of the tool at an oblique angle inwards in the direction of the axis 13. The end face 17 of the cutting crown 3, which is located opposite the upper edge 9, is constructed as a bevelled soldering surface. The carrier sleeve 5 is provided with a correspondingly bevelled upper edge 19. The bevels are preferably chosen such that the upper edge 19 of the carrier sleeve 5 is bevelled inwards so that the cutting crown 3 attached thereto is aligned in a self-centering manner and is received in the carrier sleeve 5. The connection between the cutting crown 3 and the carrier sleeve 5 is effected in the most simple manner, by means of soldering, which is a simple and resistant type of connection. Furthermore, the soldered joint permits a separation of the cutting crown 3 from the carrier sleeve 5 which can be achieved by simple measures, for example in cases in which the cutting edge area is worn out, which means that the cutting crown 3 will have to be replaced.

Figure 2:
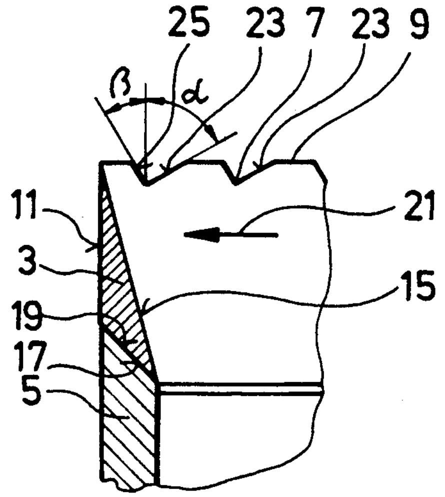
FIG. 2 shows an enlarged representation of detail X of FIG. 1.

As can additionally be seen from FIG. 2, the notches 7 are preferably V-shaped; however, the two legs of the V extend preferably at different angles relative to a plane or direction which is parallel to the axis 13. The notches may also have a different shape, provided that a sawtooth effect is produced. The driving edge 23, which is part of each notch 7 and which extends in the direction of rotation—arrow 21—is inclined at and angle $\alpha$ relative to the direction of the axis 13, said angle $\alpha$ being larger than angle an $\beta$ at which a trailing edge 25 is inclined relative to the direction of the axis 13. This has the advantage that the material can be cut through in an adequately exact manner by means of the large inclined surface and that an adequate reduction of the length of the notch area is possible due to the small inclined surface of the trailing edge 25 so that a high total number of notches 7 can be formed along the circumference of the cutting crown 3.

The carrier sleeve 5 has provided therein a recess 27, which extends from the carrier sleeve front area connected to the cutting crown 3 and which extends obliquely inwards relative to the axis 13 of the carrier sleeve 5, whereby an enlarging opening is defined. As can be seen from the side view according to FIG. 1, the opening extends preferably up to a point close to the axis of rotation so that the cut-off rubber profiles can be discharged in this area having the largest size. The recess 27 then ends in an area 29 of rapidly diminishing size.

Figure 3:
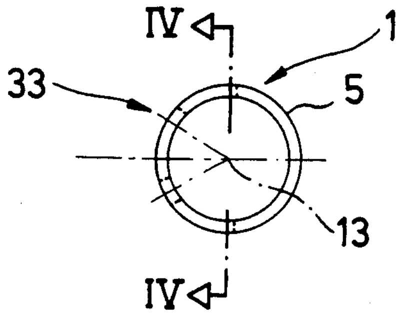
FIG. 3 shows a view of the lower end of the tool of the apparatus according to the present invention shown in FIG. 1.
Figure 4:
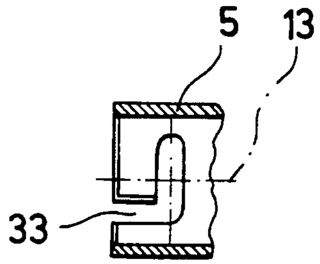
FIG. 4 shows a fragmentary sectional view according to Line A-B of FIG. 3.
Figure 5:
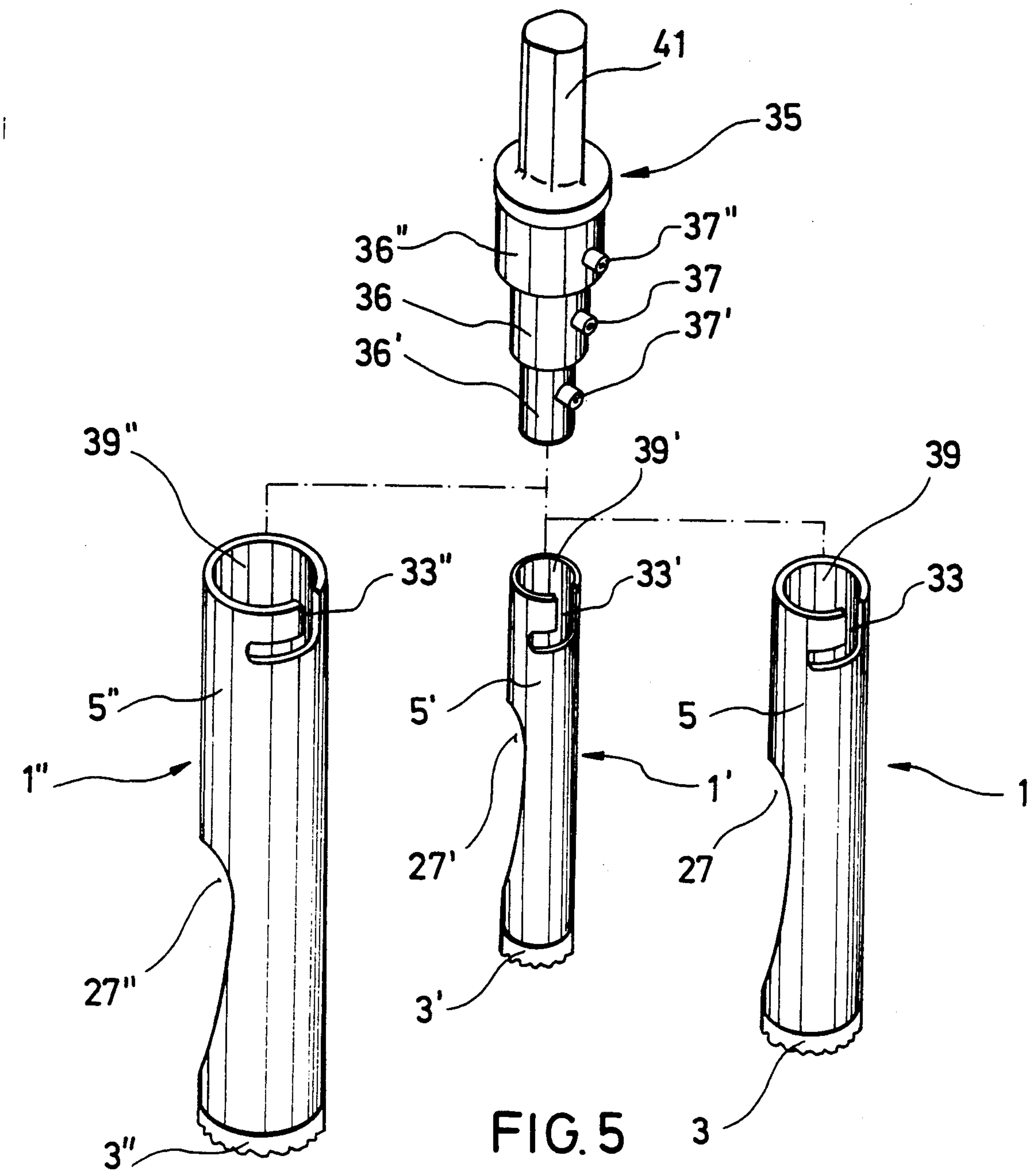
FIG. 5 shows a preferred embodiment of a reception piece of the apparatus according to the present invention, which is used for receiving tools of different diameters.
Figure 7:
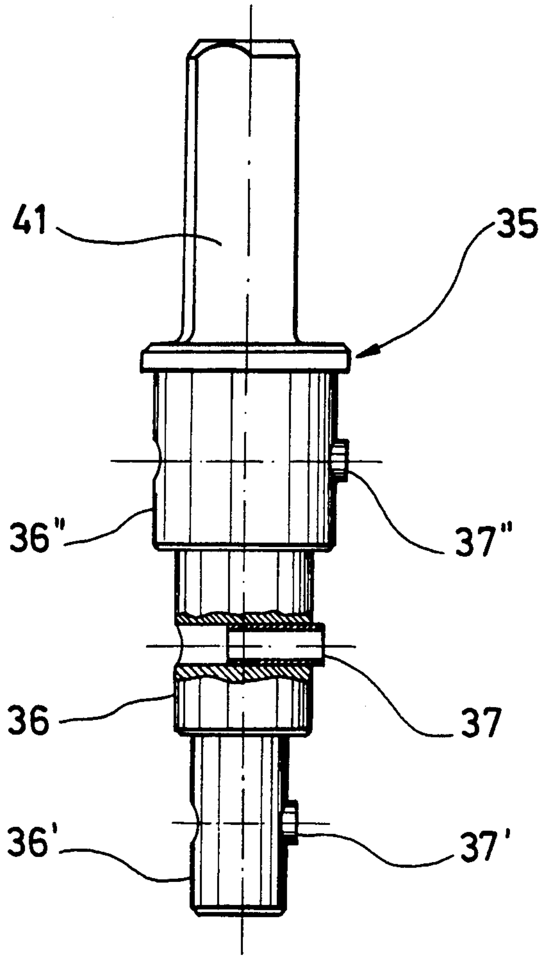
FIG. 7 shows a partially cut side view of said reception piece.

The end portion 31 of the carrier sleeve 5, which is located opposite the upper edge 19, has formed therein a recess 33, which is provided for the purpose of connecting the carrier sleeve to a reception piece 35 (FIGS. 5 and 7). The arrangement on the circumference of the carrier sleeve 5 can be seen from FIG. 3 and the structural design of said recess is clearly evident from FIG. 4. This figure shows clearly that the recess 33 has an L-shaped structural design.

The recess 33 permits a particularly simple mode of connection between the carrier sleeve 5 and the reception piece 35. For this purpose, the reception piece is provided with a tool guiding area 36, which has adequate dimensions and which is brought into fitting engagement with a guide surface 39 of the carrier sleeve 5, as is clearly evident from FIG. 5. For the purpose of connecting the carrier sleeve to the reception piece 35, the tool guiding area 36 is provided with a pin 37, which projects beyond said tool guiding area and which is adapted to be brought into engagement with the L-shaped recess 33 so that a bayonet-type connecting area is created in the most simple manner, said connecting area providing, in addition, a particularly simple and rapidly releasable connection between the reception piece and the sleeve.

As can be seen from FIG. 5; the reception piece 35 is provided with three tool guiding areas 36, 36', 36" for receiving respective carrier sleeves 5, 5', 5". The respective corresponding parts are provided with corresponding reference numerals, the reference numerals for the tool which is smaller than tool 1 having added thereto ' and those for the tool which is larger than tool 1 having added thereto ".

However, in an alternative embodiment, the reception piece 35 can also be provided with a tool guiding area whose diameter is adapted to be changed continuously or step by step so that an adequate adaptation to various carrier sleeve diameters and, consequently, cutting crown diameters can be carried out.

Figure 6:
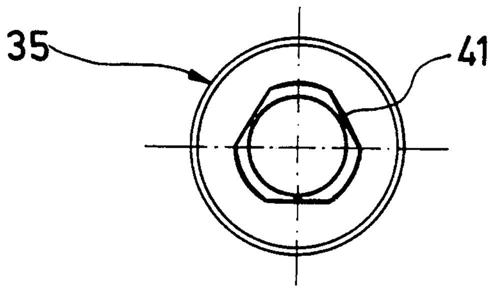
FIG. 6 shows a top view of the section which is to be inserted in a machine and which is part of the reception piece.

The end of the reception piece 35 which is located opposite the tool guiding area has formed thereon a section 41 which is to be inserted in a machine and which corresponds to the conventional standard structural design so that the reception piece can, for example, be inserted into the chuck of a portable drilling machine. FIG. 6 shows a top view of said section 41 of the reception piece 35.

FIG. 7 shows a side view of the reception piece 35 of FIG. 5, said reception piece being partially cut so as to show more clearly how the pin 37 is attached. Corresponding parts of the reception piece 35 are provided with corresponding reference numerals.

In order to sum up, it is pointed out that the statements made hereinbefore show that the apparatus according to the present invention is adapted to be used for neatly cutting out damaged portions of rubber components, in particular of steel-braced radial-ply tires, it being thus possible to produce a smooth and round area of cut.

We claim:

1. An apparatus for removing damaged portions of rubber components from products such as steel braced radial ply tires including a driven and rotating tool, said tool comprising:

a sleeve (3, 5) having a wall, an axis (13), a front edge (9) and an end portion (31) opposite said front edge; said wall including an outer circumferential surface (11) extending essentially parallel to said axis, an inner circumferential surface (15) that extends toward said outer circumferential surface adjacent said front edge, at an oblique angle relative to said axis, to form a cutting edge on said front edge, and a plurality of notches (7) formed in said front edge of said tool to interrupt said cutting edge, said notches each having an axial depth and a circumferential length sufficient to leave a plurality of circumferentially extending cutting edge segments that will, during use, prevent the cut rubber portions from making contact with each other after being cut to leave a smooth surface in the rubber component where the damaged portion is removed.

2. An apparatus according to claim 1 wherein said sleeve consists of a cutting crown (3, 3′, 3″) and a carrier sleeve (5, 5′, 5″).

3. An apparatus according to claim 2 wherein said cutting crown and said carrier sleeve have oblique end faces in confronting relation presenting matching soldering surfaces, with said end face of said cutting crown having the shape of an envelope of a cone; and said cutting crown and carrier sleeve matching surfaces are detachably connected together.

4. An apparatus according to claim 3 wherein said detachable connection is a soldered connection.

5. An apparatus according to claim 2 wherein said cutting crown is made of a material of high hardness.

6. An apparatus according to claim 5 wherein said material is a hard metal.

7. An apparatus according to claim 2 wherein said carrier sleeve has a damaged portion removal recess (27, 27′, 27″) therein.

8. An apparatus according to claim 7 wherein said damaged portion removal recess begins in said outer circumferential surface in the vicinity of said cutting crown and gradually increases in size in a direction toward said axis, said damaged portion removal recess extending toward said end portion and terminating in an end area (29).

9. An apparatus according to claim 2 further comprising a drive means for said tool having a reception piece (35), and an attachment means (33, 33′, 33″) on said carrier sleeve for connecting said carrier sleeve to said drive means reception piece.

10. An apparatus according to claim 9 wherein said attachment means includes an L-shaped recess adjacent said end portion of the carrier sleeve.

11. An apparatus according to claim 9 wherein said reception piece has at least one tool guiding area (36, 36′, 36″) for receiving said carrier sleeve thereon.

12. An apparatus according to claim 11 wherein said carrier sleeve has an L-shaped recess adjacent said end portion thereof; and said tool guiding area has a pin which projects outward from said guiding area, said pin dimensioned to releasably fit in said L-shaped recess.

13. An apparatus according to claim 9 wherein said reception piece has several tool guiding areas (36, 36′, 36″) each having a different diameter to receive carrier sleeves of different diameters.

14. An apparatus according to claim 9 wherein said reception piece has a portion (41) adapted to be inserted in a driving machine.

15. An apparatus according to claim 1 wherein the cutting edge of each of said cutting edge segments lies in a plane and said axial depth of each of said notches is less than said circumferential length of each of said notches at said cutting edge.

16. An apparatus according to claim 1 wherein each of said notches is defined by a driving edge (23) inclined to extend from said cutting edge at a first angle ($\alpha$) relative to said axis and a trailing edge (25) inclined to extend from said cutting edge at a second angle ($\beta$) relative to said axis, said first angle being larger than said second angle.

* * * * *